(12) United States Patent
Ramirez-Alcala et al.

(10) Patent No.: US 10,589,393 B2
(45) Date of Patent: Mar. 17, 2020

(54) AUTOMATIC DRILLING MACHINE FOR DRILLING IN ONE-SHOT AT LEAST TWO HOLES IN A CROSSPIECE STRUCTURE

(71) Applicant: AIRBUS OPERATIONS SL, Getafe (ES)

(72) Inventors: Carlos Ramirez-Alcala, Getafe (ES); Juan Gutierrez-Santiago, Getafe (ES); Maria Angeles Martin-Arrazola, Getafe (ES); Antonio Ortiz-Iglesias, Getafe (ES); Juan Francisco Garcia Amado, Getafe (ES)

(73) Assignee: AIRBUS OPERATIONS S.L., Getafe (ES)

(*) Notice: Subject to any disclaimer, the term of this patent is extended or adjusted under 35 U.S.C. 154(b) by 0 days.

(21) Appl. No.: 16/117,995

(22) Filed: Aug. 30, 2018

(65) Prior Publication Data
US 2019/0099848 A1   Apr. 4, 2019

(30) Foreign Application Priority Data
Oct. 4, 2017   (EP) .................................. 17382662

(51) Int. Cl.
| | | |
|---|---|---|
| *B23Q 15/12* | (2006.01) | |
| *B23Q 17/22* | (2006.01) | |
| *B23B 39/16* | (2006.01) | |
| *B23B 45/04* | (2006.01) | |
| *B25H 1/00* | (2006.01) | |

(52) U.S. Cl.
CPC ............ *B23Q 15/12* (2013.01); *B23B 39/161* (2013.01); *B23B 45/04* (2013.01); *B23Q 17/2233* (2013.01); *B25H 1/0078* (2013.01); *B23B 2215/04* (2013.01); *B23B 2270/027* (2013.01); *B25H 1/0028* (2013.01)

(58) Field of Classification Search
CPC ....... B23Q 17/22; B23B 39/161; B23B 39/18; B23B 39/16; B23B 2260/03; B23B 2270/08; B23B 2270/027
See application file for complete search history.

(56) References Cited

U.S. PATENT DOCUMENTS

| | | | |
|---|---|---|---|
| 3,826,585 A | 7/1974 | Horton et al. | |
| 2016/0067792 A1* | 3/2016 | Cardon | B23B 47/26 |
| | | | 408/1 R |

FOREIGN PATENT DOCUMENTS

| | | |
|---|---|---|
| DE | 202005020120 U1 | 2/2006 |
| EP | 3069807 A1 | 9/2016 |

OTHER PUBLICATIONS

European Search Report; priority document.

* cited by examiner

*Primary Examiner* — Alan Snyder
(74) *Attorney, Agent, or Firm* — Greer, Burns & Crain, Ltd.

(57) ABSTRACT

An automatic drilling machine for simultaneously drilling at least two holes through a surface of a crosspiece. The machine comprises an automatic drilling unit having at least two tool holders, each one adapted for receiving a drilling tool. The automatic drilling unit has a cross-shaped channel configured to receive, at least partially, the crosspiece to be drilled inside the automatic drilling unit with. The tool holders are arranged, such as, when the drilling machine is mounted with the crosspiece to be drilled, the tool holders are positioned in accordance with the locations of the crosspiece where a hole is to be drilled.

12 Claims, 9 Drawing Sheets

AUTOMATIC DRILLING MACHINE FOR DRILLING IN ONE-SHOT AT LEAST TWO HOLES IN A CROSSPIECE STRUCTURE

CROSS-REFERENCES TO RELATED APPLICATIONS

This application claims the benefit of the European patent application No. 17382662.9 filed on Oct. 4, 2017, the entire disclosures of which are incorporated herein by way of reference.

BACKGROUND OF THE INVENTION

The present invention refers in general to cutting and drilling machines for opening holes, preferably in composite structures within the aeronautical manufacturing field.

An object of the invention, is to provide a drilling machine capable of opening automatically and in one-shot (simultaneously), two or more holes in a structure with a crosspiece configuration.

Another object of the invention is to reduce drilling cycle time, reduce drilling defects, and to improve ergonomic of the machine.

One known type of drilling machines are the so-called Automatic Drilling Units (ADU), that are based on a pneumatic drill device that operates one or more drilling tools with constant drilling parameters during the whole process. ADU's allow accurate control of drilling parameters to obtain high-quality drills.

However, due to the size of conventional ADU's, these normally cannot be used for drilling in areas of difficult access, like in the inner surfaces of a crosspiece, for example for opening holes for receiving the so-called "chicken-rivets."

"Chicken-rivets" are used, even if they are not actually necessary, to assure a sturdy bond between two composite pieces, but they are used nevertheless to prevent spontaneous, and unpredictable failure of bonds in general, like peeling of fiber-reinforced plastics materials.

Therefore, in these areas of difficult access, drilling operations are usually performed manually with a machine having only one spindle, with which an operator opens holes one by one.

Obviously, this manual process is very slow, and the quality of the drill depends on the operator ability, so that parameters like advance speed and axial force depends on the skills of the human operator. Consequently, due to human imperfection and the difficulty of the area to be drilled, the proliferation of defects is common with the consequent non-quality costs.

There is the need, especially in the aeronautical industry, to improve drilling operations in terms of quality and yield times, so as to reduce production cost due to drilling operations.

SUMMARY OF THE INVENTION

The present invention is defined in the attached independent claim.

The invention refers to a semi-automatic drilling machine, that is, a machine that has to be positioned manually at the piece to be drilled, but in which the drilling operation is performed automatically in accordance with predefined drilling parameters.

The invention is based on an Automatic Drilling Unit (ADU) adapted for carrying out simultaneously several drills, preferably four, through a surface of a crosspiece with high-precision and an intuitive manner for the operator.

The automatic drilling machine of the invention comprises an automatic drilling unit, which is preferably a pneumatic device, that is adapted to perform a drilling operation automatically in accordance with predefined drilling parameters.

The automatic drilling unit has at least two tool holders, preferably four, each one adapted for receiving a drilling tool like a drilling bit.

The automatic drilling unit has a cross-shaped channel configured for coupling the unit with the crosspiece to be drilled, in such a way that the crosspiece is received at least in part, inside the automatic drilling unit, so that this cross-shaped channel has a shape similar to the shape of the crosspiece and acts as a template or guide to precisely position drilling bits fitted in the tool holders, to open holes in the desired positions of the crosspiece.

The automatic drilling unit has a pneumatic circuit, and position detecting means configured for detecting a correct position of a crosspiece when it is coupled with the automatic drilling unit, such that the pneumatic circuit is only closed, to allow suitable circulation of air, when the crosspiece is correctly coupled with the automatic drilling unit, so in this way it is assured that the drilling unit is only operative when it is correctly coupled with the crosspiece.

Furthermore, the automatic drilling unit has a displaceable fastening clamp for securing firmly the automatic drilling unit to the crosspiece during the drilling operation.

Some advantages of the invention are the following:

reduction of drilling cycle time, due to the realization of four holes in only one drilling operation (single-shot) instead of four, drilling repeatability due to the process automation, drilling defects reduction, reduction of production cost, ergonomic improvement, due to the automatic spindle advance.

BRIEF DESCRIPTION OF THE DRAWINGS

The invention and preferred embodiments thereof are henceforth described with reference to the accompanying drawings, wherein:

FIGS. 1A and 1B show a classical crosspiece structure to be drilled, like the internal reinforcement structure of an aircraft skin.

FIGS. 2A-2E show a preferred example of a machine according to the invention, wherein

FIGS. 3A and 3B show the main body of the machine, wherein

FIGS. 4A-4D show the clamping device, wherein

DETAILED DESCRIPTION OF THE PREFERRED EMBODIMENTS

Figure 1A:
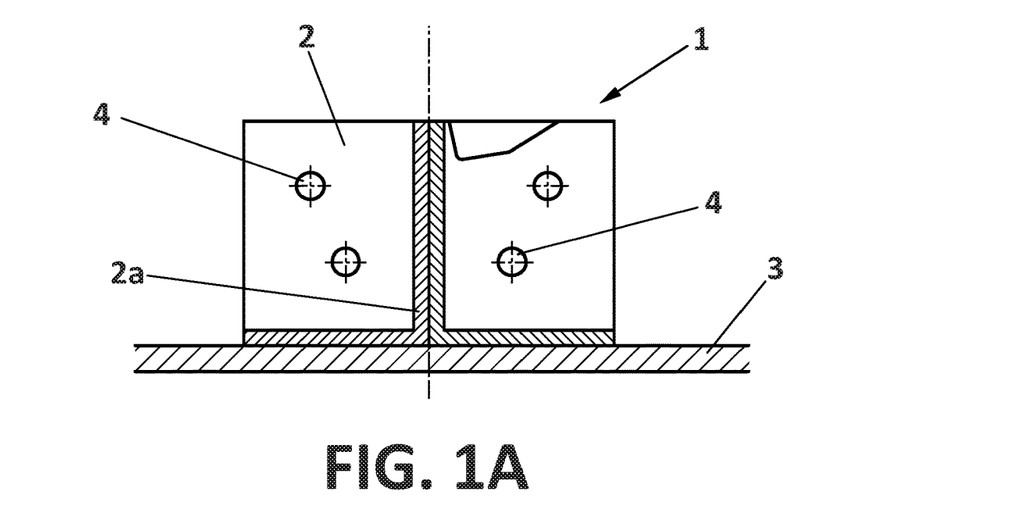
FIG. 1A is an elevational view of a crosspiece.
Figure 1B:
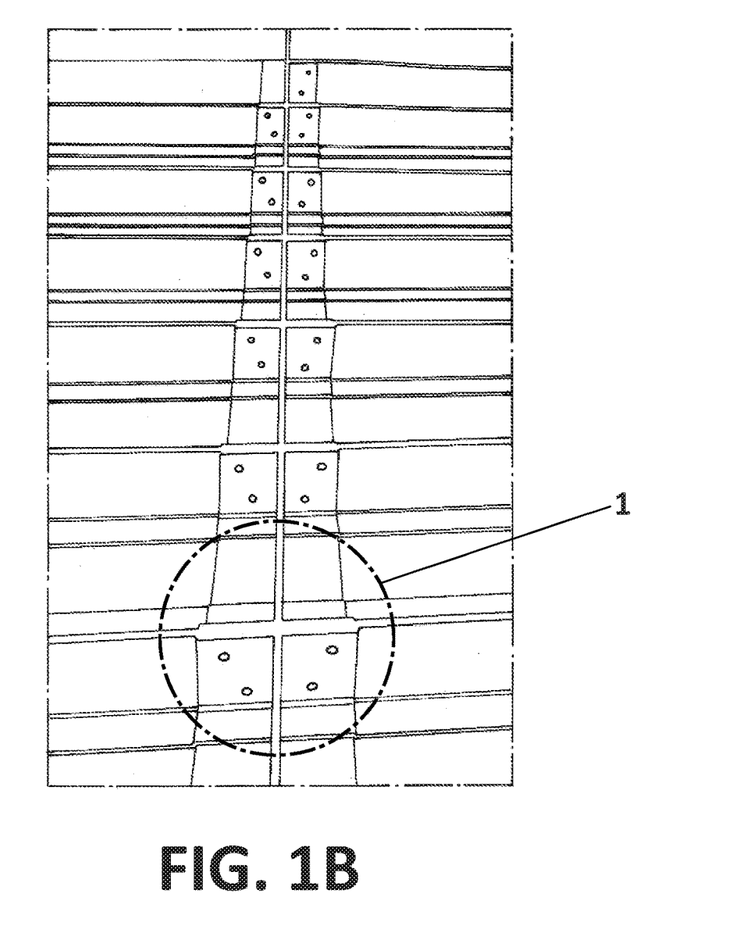
FIG. 1B is a perspective view of an aircraft reinforcement structure comprising a plurality of crosspieces.

FIG. 1 shows a classical crosspiece structure (1) formed by two reinforcement elements (2,2a) arranged transversally to each other and attached to a skin (3) to be reinforced. The location of the four holes (4) to be drilled for receiving the chicken rivets, is also shown in the figure.

FIG. 2 shows a preferred example of the automatic drilling machine according to the invention, which comprises an automatic drilling unit (5) comprising a main body (6) and a fastening clamp (7) which is displaceable relative to the main body (6), for attaching the unit to the crosspiece during the drilling operation. In particular, the fastening clamp (7) is mounted in two parallel arms (8) protruding from the main body (6), and it is adapted to move along these arms (8).

The automatic drilling unit (5) is pneumatically operated, that is, the drilling tools and the displacement of the fastening clamp, are driven by pneumatic force. An intake (9) is provided to be coupled with a source of compressed air (not shown), from which compressed air is fed to a pneumatic circuit inside the main body (6), and to the fastening clamp (7) by means of a tube (12).

Conventionally, the automatic drilling unit (5) is adapted for performing a drilling operation automatically in accordance with predefined drilling parameters.

In use, the automatic drilling unit (5) has four tool holders (13) each one having a drilling bit (14) fitted therein. As shown in the figures, the tool holders (13) and drilling bits (14) are provided in the fastening clamp (7), so that they are displaceable together with the fastening clamp (7).

The machine is conventionally provided with handles (10) and with a suction system (11) for suctioning out shavings and dust from the drilled material, and a drilling holes counter (not shown) for controlling the cutting tool's lifetime.

The automatic drilling unit (5) has a cross-shaped channel configured for receiving at least partially the crosspiece (1) to be drilled inside the automatic drilling unit. This cross-shaped channel is formed at the bottom area of the machine, and it is formed by two substantially flat channels transversally arranged to each other configuring a cross generally matching the shape of a crosspiece to be drilled.

A first channel (15) is formed in part in the main body (6) and in part in the fastening clamp (7), so that that channel (15) runs longitudinally in the machine preferably at its center line. The position and extension of this channel (15) is shown in FIG. 2C as a dotted line.

Figure 2A:
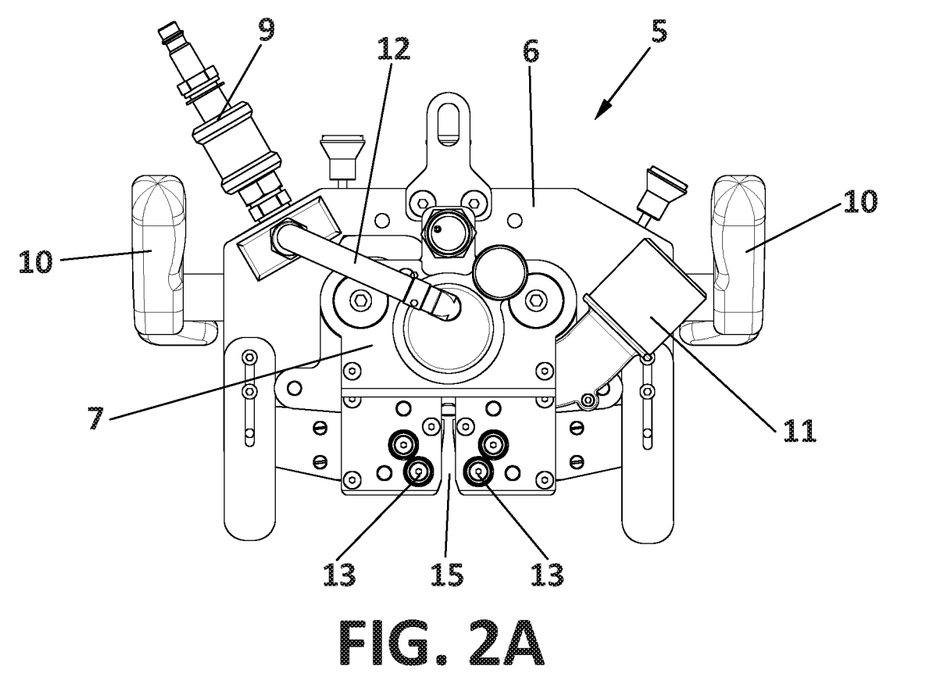
FIG. 2A is a front elevational view.
Figure 2B:
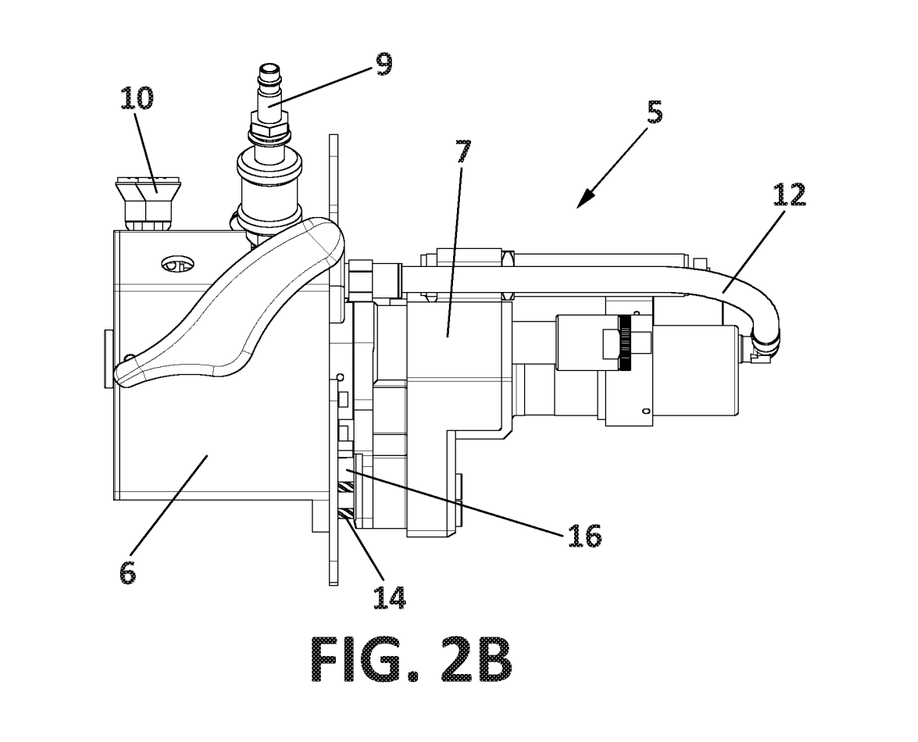
FIG. 2B is a side elevational view.
Figure 2C:
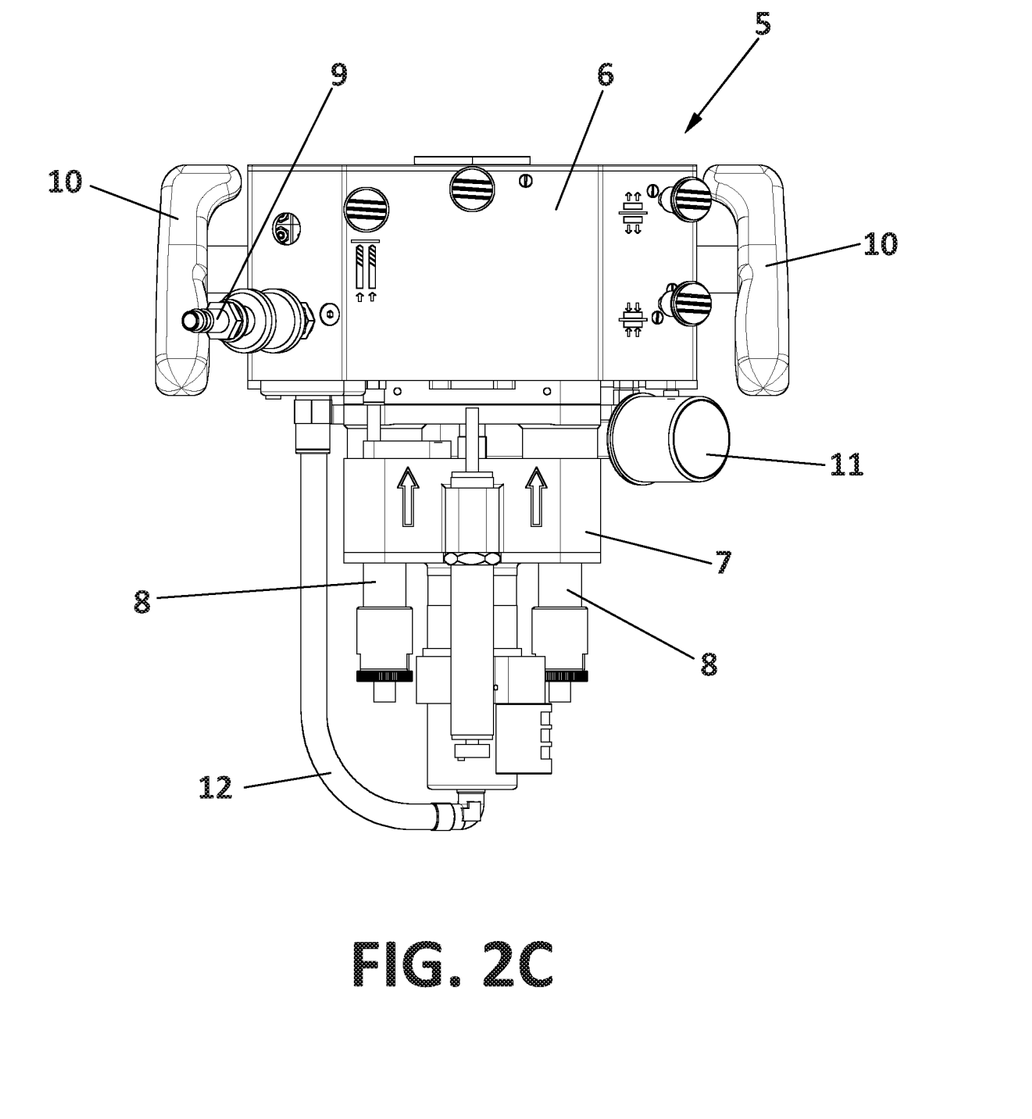
FIG. 2C is a top plan view.
Figure 2D:
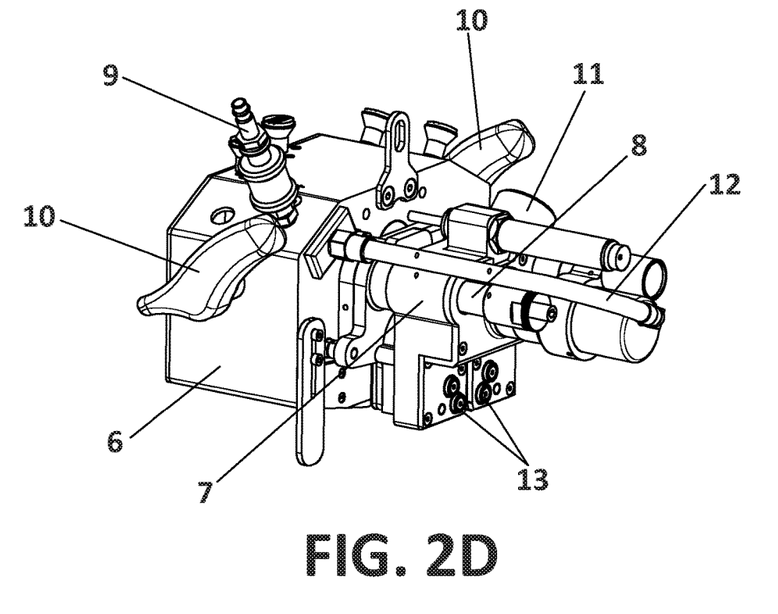
FIG. 2D is a perspective view.
Figure 2E:
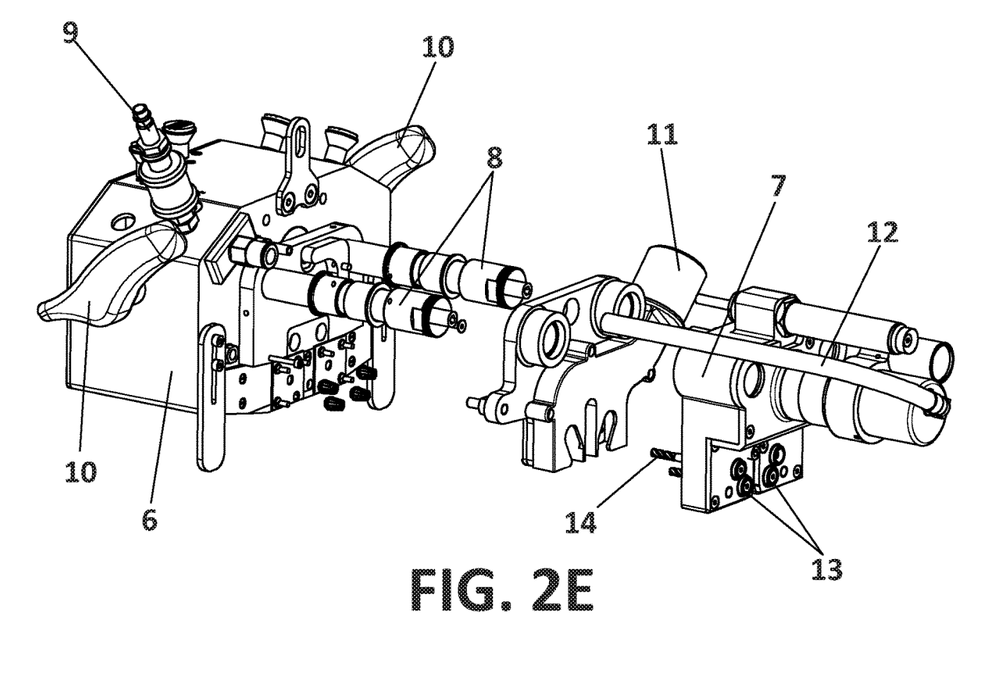
FIG. 2E is an exploded view.
Figure 3A:
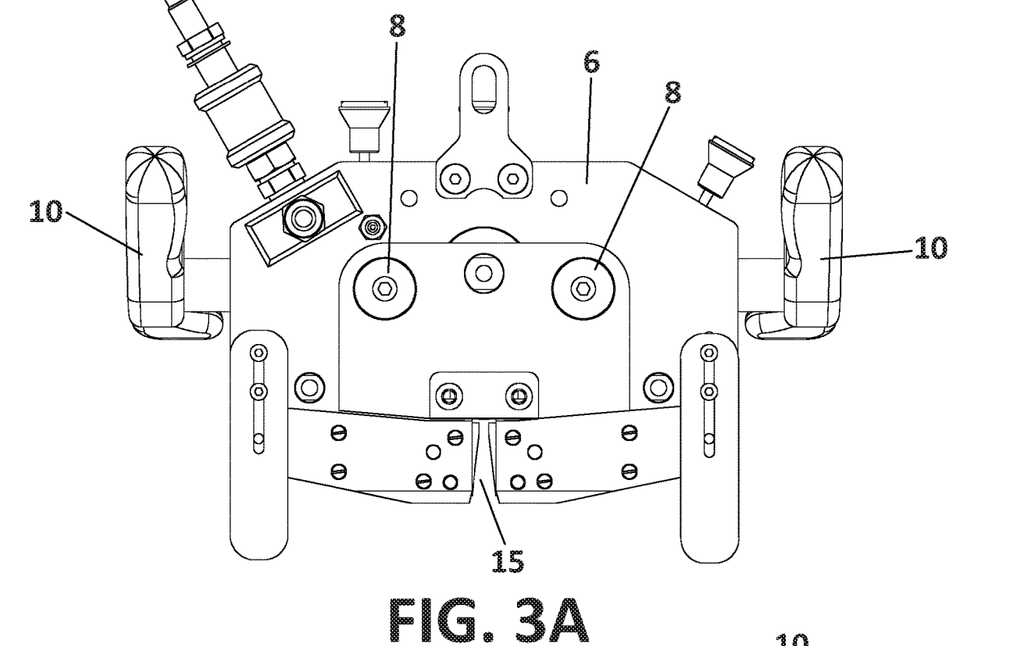
FIG. 3A is a front elevational view and FIG. 3B is a perspective view.
Figure 3B:
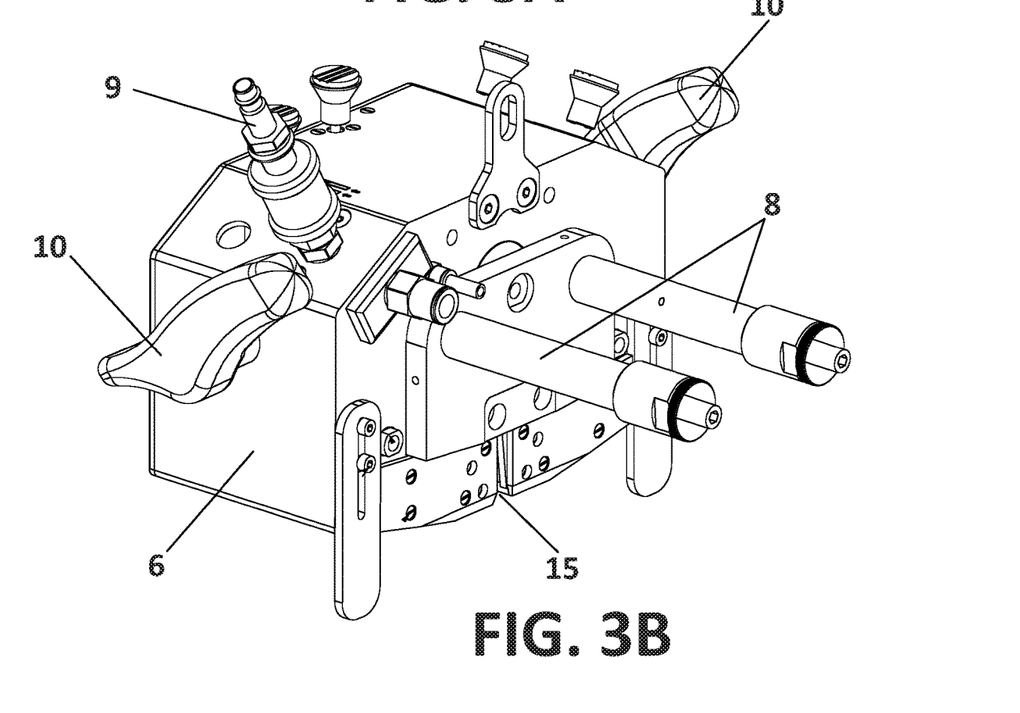

A second channel (16) is formed by the separation gap between the main body and the fastening clamp (6,7), when the fastening clamp (7) is in its nearest position to the main body (6) as shown, for example, in FIG. 2B. The second channel (16) is orthogonal to the first channel (15).

Figure 4A:
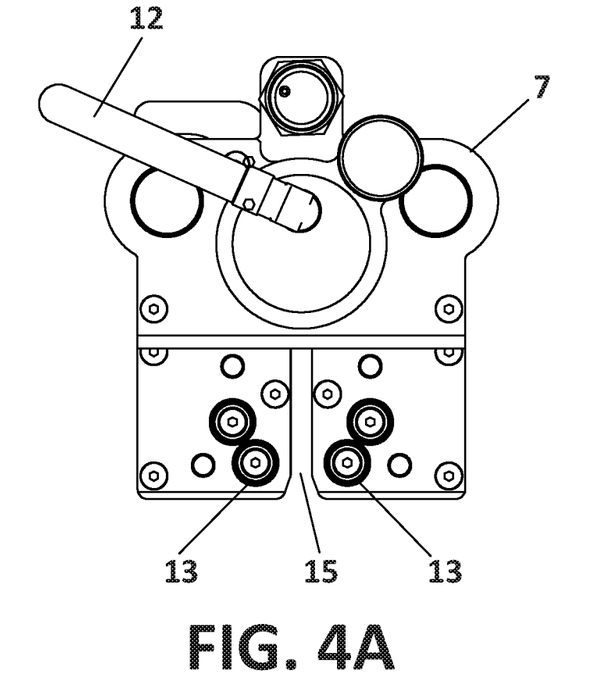
FIG. 4A is a front elevational view.
Figure 4B:
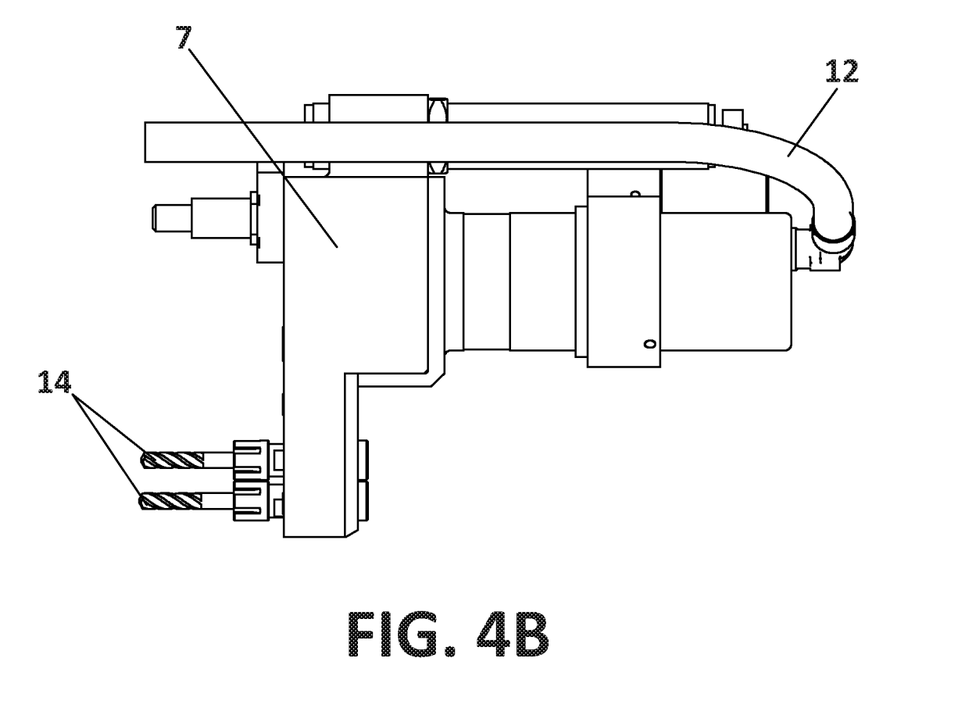
FIG. 4B is a side elevational view.
Figure 4C:
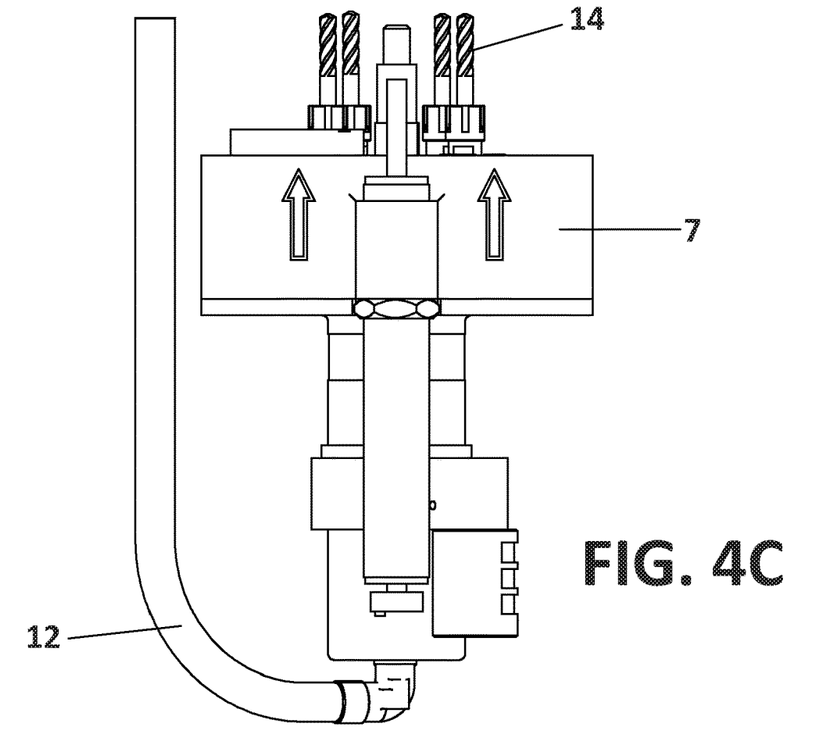
FIG. 4C is a top plan view.
Figure 4D:
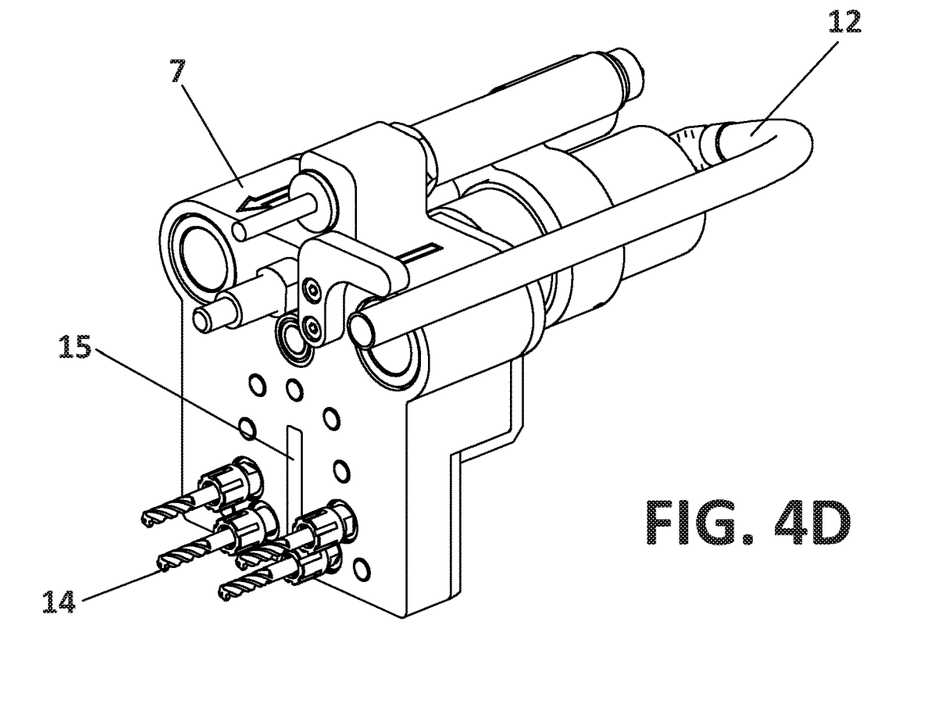
FIG. 4D is a perspective view.
Figure 5:
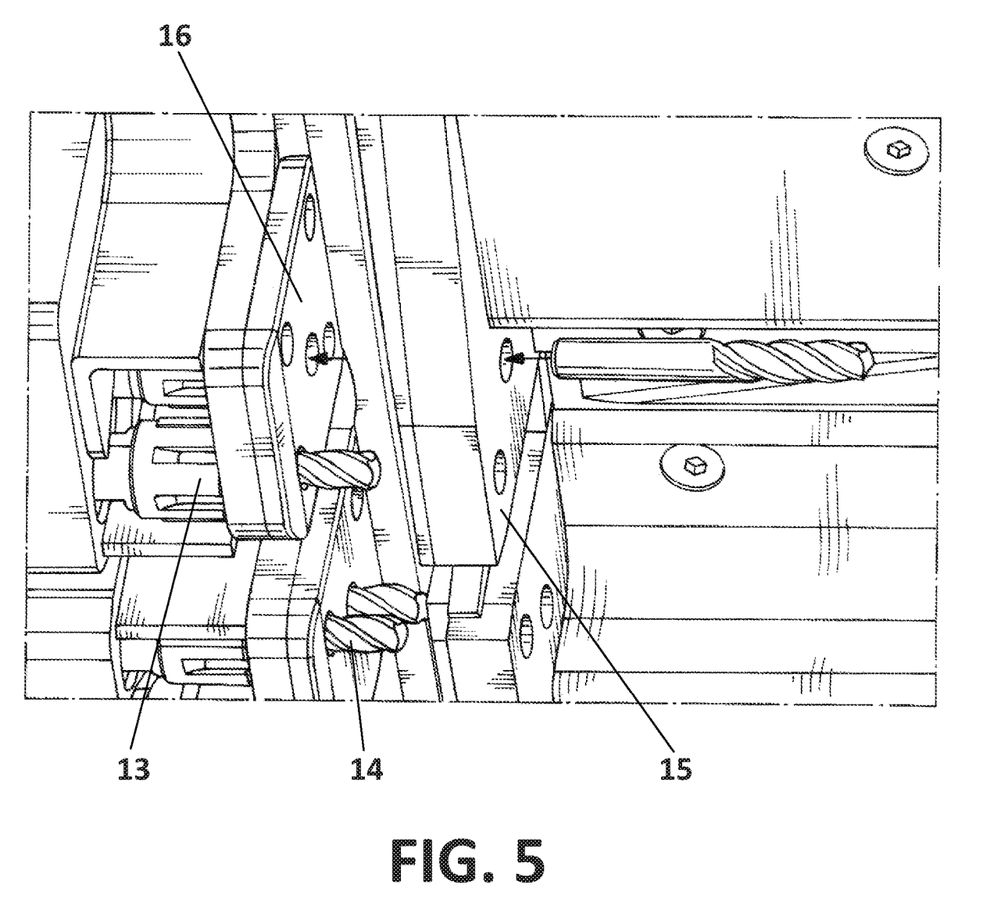
FIG. 5 shows a perspective view from below of the machine of the invention.

The axis of the drilling bits (14) are transversally arranged to the second channel (14) (see FIG. 2B), and parallel to the first channel (15) (see FIGS. 4A,C). Additionally, the axis of the tool holders (13) and the axis of the drilling bits (14) are arranged, such as when the drilling machine is mounted with the crosspiece (1) to be drilled, the tool holders are positioned in accordance with the locations of the crosspiece where a hole is to be drilled, that is, facing or in front of the spots where a hole is to be opened.

The automatic drilling unit further comprises position detecting means configured and arranged to detect a correct position of a crosspiece when it is correctly coupled with the automatic drilling unit. Preferably, this position detecting means comprises an opening in the pneumatic circuit arranged in correspondence with the cross-shaped channel, so that when a crosspiece is correctly placed within the cross-shaped channel, the opening is closed by the crosspiece. Alternatively, the position detecting means may be implemented as a type of end-of-run switch.

The position detecting means are operatively associated with the pneumatic circuit of the machine, such as the pneumatic circuit is only closed to allow suitable circulation of air, when the crosspiece is correctly coupled with the automatic drilling unit.

Figure 6:
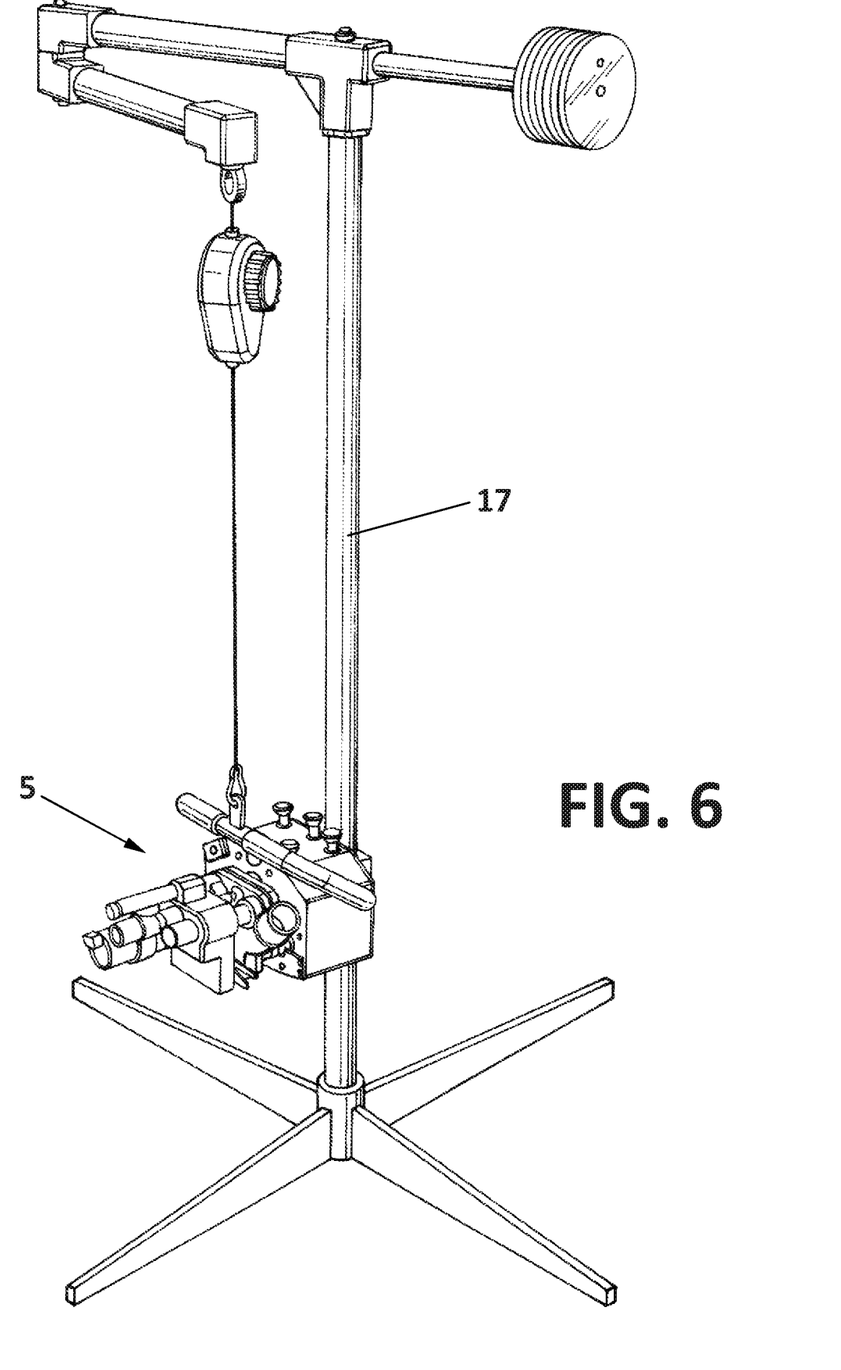
FIG. 6 shows a perspective view of the machine in use with the assistance of an anti-gravity arm.

As shown in FIG. 6, the use of the machine can be assisted by an anti-gravity arm (17).

For using the machine, this is coupled with a crosspiece (1) as the one shown in FIG. 1A, in such a way that the reinforcement elements (2,2a) are fitted inside first and second channels (16,15) respectively. When the machine is in the right position, the position detecting means are activated, that is, a part the crosspiece closes the opening of the pneumatic circuit so that this circuit is closed, and pressurized air can flow through it. Then, the fastening clamp (7) is automatically activated and moves towards the main body (6) thereby fastening the machine to the crosspiece.

The machine is configured so that the drilling process can be activated only when the machine is correctly placed in the crosspiece and the pneumatic circuit is closed. This assures that the holes are drilled precisely in the desired locations. In that situation, the drilling process is initiated when an operator manually presses a push-bottom, and the drilling process is performed automatically, and four holes are opened at the same time.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An automatic drilling machine for simultaneously drilling at least two holes through a surface of a crosspiece, the machine comprising:
   an automatic drilling unit comprising a main body having at least two tool holders, each one adapted for receiving a drilling tool,
   wherein the automatic drilling unit has a cross-shaped channel configured for receiving, at least partially, the crosspiece to be drilled inside the automatic drilling unit, and
   wherein the tool holders are arranged and positioned, when the drilling unit is mounted with the crosspiece to be drilled, in accordance with locations of the crosspiece where the at least two holes are to be drilled,
   wherein the automatic drilling unit is a pneumatic device and has a pneumatic circuit, the automatic drilling unit further comprising position detecting means configured and arranged to detect a correct position of the crosspiece when the crosspiece is coupled with the automatic drilling unit, and wherein the position detecting means are operatively associated with the pneumatic circuit.

2. The machine according to claim 1, wherein the operative association of the position detecting means with the pneumatic circuit comprises that the pneumatic circuit is only closed when the crosspiece is correctly coupled with the automatic drilling unit.

3. The machine according to claim 1, wherein the automatic drilling unit has a displaceable fastening clamp for attaching the unit to the crosspiece during a drilling operation.

4. The machine according to claim 2, wherein the position detecting means comprises an opening in the pneumatic circuit arranged in correspondence with the cross-shaped channel, so that when the crosspiece is correctly coupled with the automatic drilling unit, the opening is closed by the crosspiece.

5. The machine according to claim 3, wherein the fastening clamp is pneumatically operated.

6. The machine according to claim 1, wherein the automatic drilling unit comprises four tool holders.

7. The machine according to claim 3, wherein the tool holders are provided in the fastening clamp.

8. The machine according to claim 3, wherein the cross-shaped channel comprises a first channel formed in part in the main body and in part in the fastening clamp, so that that channel runs longitudinally in the machine.

9. The machine according to claim 8, wherein the channel runs along a center line of the machine.

10. The machine according to claim 8, wherein the cross-shaped channel comprises a second channel formed by the separation gap between the main body and the fastening clamp, when the fastening clamp is positioned nearest to the main body.

11. The machine according to claim 10, wherein the drilling tools are transversally arranged to the second channel, and parallel to the first channel.

12. The machine according to claim 1, wherein the machine is configured so that a drilling process is activatable only when the machine is correctly placed in the crosspiece.

* * * * *